3,347,882
AMINO-AMIDE REACTION PRODUCTS OF
HYDROXYACIDS, EPOXY COMPOUNDS
AND POLYAMINES
Paul Zuppinger, Arlesheim, Ulrich Niklaus, Basel, Kurt Brugger, Munchenstein, and Heinrich Zwicky, Therwil, Switzerland, assignors to Ciba Limited, Basel, Switzerland, a Swiss company
No Drawing. Filed Apr. 1, 1963, Ser. No. 269,815
Claims priority, application Switzerland, Apr. 5, 1962, 4,183/62
7 Claims. (Cl. 260—404.5)

The present invention provides new amides containing amino groups, which are obtained when an aliphatic monocarboxylic acid which contains at least one alcoholic hydroxyl group and at least 12 carbon atoms, or an ester of such acid with a monohydric or polyhydric alcohol, is reacted in a first stage of the process with a monoepoxy compound and/or polyepoxy compound while at least partially etherifying the alcoholic hydroxyl group or groups of the monocarboxylic acid or of its ester, and the resulting etherified product is reacted in a second stage with an aliphatic diamine or polyamine containing at least two primary or secondary amino groups, accompanied by elimination of water or of alcohol.

In general, the new amides containing amino groups are pale liquids; they are readily compatible with most conventional types of epoxy resins. The mixtures of the amides and the epoxy resins can be cured at room temperature or with heating to furnish insoluble and infusible resins having excellent mechanical properties. Such curable mixtures are especially valuable in surface protection. Compared with the generally highly viscous types of polyamides known as curing agents for epoxy resins—for example the polyamides obtained by reacting unsaturated dimerized vegetable fatty acids with aliphatic diamines or polyamines—the new amides of the invention possess numerous advantages. By virtue of their generally much lower viscosity they can be used for solvent-free lacquer systems having good flow properties and as laminating resins. When the lacquer films are cured, the misting of the film surface or the sweating out of undesirable fatty substances on the film surface, which accompanies most known curable lacquer compositions based on epoxy vantage when one or several more lacquer coats are to be applied to a lacquer prime coat which has already dried.

The reaction of the aliphatic monocarboxylic acid containing hydroxyl groups with the epoxy compound is performed without attacking the carboxyl group, advantageously in the presence of a Lewis acid, more especially boron trifluoride, or a complex thereof, for example boron trifluoride diethyl etherate. In general, the reaction is exothermic so that no external heating is needed during the first stage of the reaction.

As suitable aliphatic saturated or unsaturated monocarboxylic acids containing hydroxyl groups and at least 12 carbon atoms, to be used as starting materials in the manufacture of the new amides, there may be mentioned: Hydroxy-caprylic acid and more especially hydroxy fatty acids with 12 to 18 carbon atoms, such as 12-hydroxy-stearic acid or more especially 12-hydroxyoleic acid (=ricinoleic acid) as well as dihydroxycarboxylic acids obtained by adding hydrogen peroxide on to unsaturated higher fatty acids, such as 9:10-dihydroxystearic acid, 9:10-dihydroxypalmitic acid, or mixtures of these acids. Furthermore: dihydroxycarboxylic acid-monoalkyl ethers or monoaryl ethers of high fatty acids, such as 9:10-dihydroxystearic acid monobutyl ether, 9:10-dihydroxystearic acid monophenyl ether, 9:10-dihydroxy-palmitic acid mono(tertiary butylphenyl) ether, 9:10-dihydroxylauric acid (chlorophenyl) ether or mixtures thereof.

Instead of the free monocarboxylic acids there may be used in the process of the invention their esters with monohydric alcohols, such as methanol, ethanol, propanol, isopropanol, butanol, isobutanol, 1-hexanol, or esters with polyhydric alcohols such as ethyleneglycol, 1:4-butanediol, 1:2:4-hexanetriol or more especially glycerol.

There may be mentioned glycerol-tris-ricinoleate and animal or vegetable fats or oils derived from fatty acids containing hydroxyl groups, more especially castor oil.

As epoxy compounds to be reacted according to the invention with the monocarboxylic acids containing hydroxyl groups, or their esters, there are suitable monoepoxides and polyepoxides. The following monoepoxides may be mentioned:

Ethylene oxide, propylene oxide, butylglycide, allyl-glycidyl ether, phenylglycidyl, cresylglycide, styrene oxide, 3:4-epoxy-tetrahydrodicyclopentadienol-8:3, 3:4-epoxy-hexahydrobenzal glycerol, cyclohexene oxide, 3:4-epoxycyclohexane-1:1-dimethanol acrolein acetal, tetrahydrofurfuryl-glycidyl ether and butadiene monoepoxide.

As polyepoxides there may be mentioned: Alicyclic polyepoxides such as vinylcyclohexene dioxide, limonene dioxide, dicyclopentadiene dioxide, ethyleneglycol-bis(3:4-epoxy-tetrahydrodicyclopentadien-8-yl)ether, (3:4-epoxy-tetrahydrodicyclopentadien-8-yl)glycidyl ether, butadiene diepoxide; also compounds containing two epoxycyclo-hexyl residues such as 3:4-epoxy-hexahydrobenzal-3:4-epoxycyclohexane-1:1-dimethanol.

Basic polyepoxy compounds obtained by reaction of primary or secondary aliphatic or aromatic diamines, such as aniline, toluidine, 4:4'-diaminodiphenylmethane, 4:4'-di-(monomethylamino)-diphenylmethane or 4:4'-di-aminodiphenyl-sulfone, with epichlorohydrin in the presence of alkali.

Polyglycidyl ethers obtained by etherifying a dihydric or polyhydric alcohol or diphenyl or polyphenol with epichlorohydrin or dichlorohydrin in the presence of alkali. These compounds may be derived from glycols, such as ethyleneglycol, diethyleneglycol, triethyleneglycol, 1:3-propyleneglycol, 1:4-butyleneglycol, 1:5-pentanediol, 1:6-hexanediol, 2:4:6-hexanetriol, glycerol and more especially from diphenols or polyphenols, such as resorcinol, pyrocatechol, hydroquinone, 1:4-dihydroxynaphthalene, phenol-formaldehyde condensation products of the resole or novolak type, bis[para-hydroxyphenyl]methane, bis[para - hydroxyphenyl]methylphenyl-methane, bis[para - hydroxyphenyl]tolylmethane, 4:4' - dihydroxydiphenyl, bis[para - hydroxyphenyl]sulfone and more especially bis[para - hydroxyphenyl]dimethyl-methane.

Specifically, there may be mentioned the epoxy resins which are liquid at room temperature, derived from bis[para - hydroxyphenyl]dimethylmethane (=bisphenol A), which contain about 3.8 to 5.8 epoxide equivalents per kg. Such epoxy resins correspond to the average formula

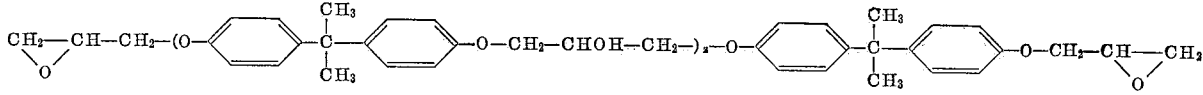

where $z$ is a small whole or fractional number from 0 to 2.

Furthermore, there may be used mixtures of two or more than two of the aforementioned monoepoxides and/or polyepoxides.

The further reaction of the primarily formed etherified aliphatic hydroxymonocarboxylic acids or their esters with the diamine or polyamine respectively is advantageously carried out with heating, for example to a temperature ranging from 200° to 250° C., while distilling off the water eliminating during the reaction and/or the esterifying alcohol.

As aliphatic polyamines containing at least two primary or secondary amino groups, to be used as starting materials in the present process there are suitable diprimary, primary-secondary and disecondary polyamines of the aliphatic series. The following may be mentioned: N-hydroxyalkyl - alkylenepolyamines, for example N-hydroxyethyl - ethylene - diamine, N - hydroxyethyl-pentamethylene - diamine, N - hydroxy - propyl - tetra-methylenediamine, N-hydroxyethyl - diethylenetriamine, N:N - di[hydroxyethyl]diethylenetriamine, N:N" - di[hydroxyethyl]diethylene - triamine, N - hydroxypropyl-diethylene - triamine, N:N - di[hydroxypropyl]diethyl-enetriamine, N:N"-di[hydroxypropyl]diethylenetriamine, N:N:N" - tri[hydroxypropyl] - triethylene - tetramine, N-hydroxyethyl - propylenediamine, N-hydroxypropyl-propylenediamine, N-hydroxyethyl - dipropylenetriamine, N:N - di[hydroxyethyl]dipropylenetriamine, N:N:N'-tri[hydroxyethyl]triethylenetetramine, hexamethylene-diamine; also cyanoethylated primary polyamines, for example the reaction products from 1 to 2 molecular proportions of acrylonitrile with 1 molecular proportion of ethylenediamine, diethylenetriamine or triethylenetetramine. Preferred use is made of diprimary alkylenepolyamines, for example ethylenediamine, diethylenetriamine, triethylene-tetramine, tetraethylenepentamine, trimethylenediamine or hexamethylenediamine.

As mentioned above, the new amides containing amino groups are valuable curing agents for epoxy resins. Accordingly, the present invention includes also curable mixtures of epoxy compounds having an epoxide equivalence greater than 1 and amides containing amino groups as curing agents, which are obtained when an aliphatic monocarboxylic acid which contains at least one alcoholic hydroxyl group and at least 12 carbon atoms, or an ester of such acid with a monohydric or polyhydric alcohol, is reacted in a first stage of the process with a monoepoxy and/or polyepoxy compound, while at least partially etherifying the alcoholic hydroxyl group or groups of the monocarboxylic acid or of its ester, and in a second stage the resulting etherified product is reacted with an aliphatic diamine or polyamine containing at least two primary or secondary amino groups, while eliminating water or alcohol. As epoxy compounds having an epoxide equivalence greater than 1, which are used in the curable mixtures, there are suitable the identical diepoxides and polyepoxides that have been indicated above as suitable starting materials for the manufacture of the new polyamides. As is known, the usual methods of manufacturing polyepoxides lead in general to mixtures of compounds whose molecular weights differ from one another, and these mixtures further contain a proportion of compounds whose terminal epoxide groups have been partially hydrolyzed. The epoxide equivalence of polyepoxide compounds need, therefore, not be a whole number, at least 2, but in each it must be greater than 1.0.

The term "curing" as used in this context signifies the conversion of the epoxy compound into an insoluble and infusible resin.

The curable mixtures of the invention may further contain suitable plasticisers, such as dibutyl phthalate, dioctyl phthalate or tricresyl phosphate, inert diluents or so-called active diluents, more especially monoepoxides, for example butylglycide or cresylglycide.

Furthermore, there may be added to the curable mixtures of the invention, at any stage prior to the curing operation, other usual additives, such as fillers, dyestuffs, pigments, flame-inhibitors, mould lubricants or the like. Suitable extenders and fillers are, for example, asphalt, bitumen, glass fibers, mica, quartz meal, cellulose, koalin, ground dolomite, colloidal silica having a large specific surface (Aerosil) or metal powders, such as aluminum powder.

The curable mixtures of the invention may be used with or without fillers, if desired in the form of solutions or emulsions, as laminating resins, paints, lacquers, dipping resins, casting resins, moulding compositions, sealing compounds, putties, flooring compositions, potting and insulating compounds for the electrical industry, adhesives and the like, as well as for the manufacture of such products.

In the following examples parts and percentages are by weight. The relationship between part by weight and part by volume is the same as that between the kilogram and the liter.

Example 1

730 parts of an epoxy resin which is liquid at room temperature (prepared by condensing 1 molecular proportion of bis[para-hydroxyphenyl]dimethylmethane with at least 2 molecular proportions of epichlorohydrin in the presence of aqueous sodium hydroxide solution), and contains 5.2 gram equivalents of epoxide groups per kg., and 800 parts of styrene oxide are vigorously stirred within about 3 minutes into a mixture of 3000 parts of ricinoleic fatty acid and 43.7 parts of boron trifluoride diethyl etherate (containing 38% of $BF_3$). The temperature rises immediately to about 98° C. The batch is allowed to react fully for 30 minutes, whereupon in the course of about 7 minutes 1460 parts of triethylenetetramine are added. The whole is then heated for about 3 hours at 200° C., during which 215 parts by volume of water pass over. The mixture is allowed to react further for 2 hours under a rising water-jet vacuum so that by the time the reaction is complete a total of 665 parts by volume of volatile constituents have passed over. Yield: 5300 parts of a polyamine-amide having a viscosity of 36, 400 centipoises measured at 20° C. and a color index 10 to 11 according to Gardner.

The borontrifluoride-amine complex formed is insoluble in the final product. If it is desired to remove it, the final product is taken up in about 3500 parts of toluene and the whole is filtered and evaporated, to yield a completely clear, transparent product.

Example 2

The process described in Example 1 is performed with 1520 parts of butylglycide instead of with the mixture of 730 parts of epoxy resin containing 5.2 epoxide equivalents per kg. and 800 parts of styrene oxide.

There are obtained 5320 parts of a polyamine-amide having a viscosity of 4550 centipoises measured at 20° C. and a color index 10 according to Gardner. After having been filtered, the product is completely clear and transparent.

Example 3

The process described in Example 1 is performed with the use of 1820 parts of cresylglycide instead of with the mixture of 730 parts of epoxy resin containing 5.2 epoxide equivalents per kg. and 800 parts of styrene oxide, and of 1030 parts of diethylenetriamine instead of 1460 parts of triethylenetetramine. Yield: 5500 parts of a polyamine-amide of low viscosity (about 4000 centipoises at 20° C.), color index according to Gardner, 10. The filtered product is completely clear and transparent.

Example 4

152 parts of butylglycide are added to a mixture of 313 parts of castor oil and 4.37 parts of a solution of 48% strength of borontrifluoride diethyl etherate, during which the temperature rises to 80° C. The batch is allowed to react for 15 minutes while being thoroughly stirred. Within 3 minutes 292 parts of triethylenetetramine are added while heating the batch to 250° C. 500 parts of toluene are added and in the course of 6½ hours, at an internal temperature of 200 to 215° C., the excess triethylenetetramine and the glycerol are distilled off azeotropically under a rising water-jet vacuum (total distillate: 625 parts). Yield: 250 parts of a polyamine-amide of low viscosity (about 3000 centipoises at 20° C.). Color index according to Gardner: about 9. The filtered product is completely clear and transparent.

Example 5

The process described in Example 1 is performed with the use of only 600 instead of 800 parts of styrene oxide and, instead of 730 parts of epoxy resin containing 5.2 epoxide equivalents per kg., there is used a solution of 780 parts of the diepoxide of the formula

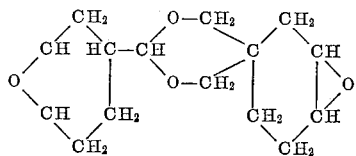

in 780 parts of toluene.

Yield: 5400 parts of a polyamine-amide having a viscosity of 10,050 centipoises at 20° C. Color index according to Gardner: 9–10.

Example 6

Clear lacquers are prepared by mixing an epoxy resin which is liquid at room temperature (prepared by condensing 1 molecular proportion of bis[para-hydroxyphenyl]dimethyl-methane with at least 2 molecular proportions of epichlorohydrin in the presence of aqueous sodium hydroxide solution), which contains 5.2 epoxide equivalents per kg. and has a viscosity of about 12,000 centipoises at 25° C. (Resin A), with the polyamides manufactured as described in Examples 1 to 5 in the proportions shown in the following table. The clear lacquers are applied to plates of glass and sheets of aluminum with a lacquer coating device. The lacquer films are then dried or cured respectively under the conditions shown in the table, and the times taken by them to become dust-dry are measured. In the case of the films cured on plates of glass the transparence and the hardness (measured with a pendulum hardness tester according to Persoz) are tested. In the case of the films cured on aluminum sheets the stretchability (Erichsen indentation test according to DIN 53 156) is measured. The results are shown in the following table in which there are further shown the pot life values of the curable clear lacquers.

| Test No. | Polyamine-amide From Ex. No. | Polyamine-amide Amount grams | Resin A, amount grams | Pot life (g.) of lacquer, hrs./20° C. | Drying or curing conditions | Dust-dry after hours | Transparence of film on glass Before drying | Transparence of film on glass After drying | Pendulum hardness according to Persoz, in seconds immediately after curing (days) after— | | | | | Indentation value (Erichsen) (mm.) |
|---|---|---|---|---|---|---|---|---|---|---|---|---|---|---|
| | | | | | | | | | 2 | 4 | 8 | 16 | 28 | |
| 1 | 1 | 30 | 70 | 4½ (100 g.) | 20° C., 65% relative atmos. moisture. | 22½ | Clear | Clear | 36 | 62 | 91 | 123 | 182 | |
| 2 | 1 | 40 | 60 | 4 (100 g.) | ----do---- | 22½ | ---do--- | ---do--- | 122 | 189 | 228 | 262 | 304 | |
| 3 | 1 | 50 | 50 | 3¾ (100 g.) | ----do---- | 25 | ---do--- | ---do--- | 158 | 215 | 252 | 250 | 246 | 8.1 |
| 4 | 2 | 30 | 70 | 5½ (100 g.) | ----do---- | 41½ | ---do--- | ---do--- | 15 | 19 | 28 | 38 | 115 | |
| 5 | 2 | 40 | 60 | 5 | ----do---- | 32½ | ---do--- | ---do--- | 24 | 46 | 85 | 125 | 193 | |
| 6 | 2 | 50 | 50 | 4½ | ----do---- | 30 | ---do--- | ---do--- | 26 | 55 | 90 | 99 | 117 | 8.5 |
| 7 | 3 | 50 | 50 | 48 (10 g.) | 18–22° | 48–64 | ---do--- | ---do--- | | 36 | 49 | 81 | | 9.6 |
| 8 | 3 | 50 | 50 | 48 (10 g.) | 60°, 24 h | 14 | ---do--- | ---do--- | 113 | | | | | 9.7 |
| 9 | 4 | 50 | 50 | 24 | 18–22° | 30–40 | ---do--- | ---do--- | 29 | | | | 200 | 7.8 |
| 10 | 4 | 50 | 50 | 24 | 120°, 1 h | 1 | ---do--- | ---do--- | 195 | | | | | 8.7 |
| 11 | 5 | 33.3 | 66.6 | 6¾ (10 g.) | 18–22° | 17¼ | ---do--- | ---do--- | 21 | 154 | 204 | 262 | | 9.1 |
| 12 | 5 | 33.3 | 66.6 | 6¾ (10 g.) | 60°, 24 h | 14 | ---do--- | ---do--- | 310 | | | | | 8.8 |
| 13 | 5 | 50 | 50 | 6¾ (10 g.) | 18–22° | 13¼ | ---do--- | ---do--- | 33 | 113 | 157 | 275 | | 7.9 |
| 14 | 5 | 50 | 50 | | 60°, 24 h | 10 | ---do--- | ---do--- | 304 | | | | | 6.0 |

Example 7

Within 1 hour 174 parts of propylene oxide are added to a mixture of 313 parts of castor oil and 4.37 parts of a solution of 48% strength of boron trifluoride diethyl etherate, during which the temperature rises to 110° C. To hydroylze the triglyceride, the reaction product is mixed with a solution of 54 parts of concentrated sulfuric acid in 130 parts of water, with addition of 3 parts of 1-hydroxy-4-sulfo-2-naphthoic acid stearylamide, and the whole is thoroughly stirred for 24 hours at 90 to 95° C. The hydrolysis product is then separated from the water, with addition of sodium chloride, and repeatedly washed with hot water until the washings run free from sulfate ions.

Yield: 450 parts of a light-yellow product having an acid number of 114. This product is reacted with 146 parts of triethylenetetramine as described in Example 1, to yield 550 parts of a bright polyamine-amide of low viscosity, which is readily compatible with the Resin A of Example 6. Lacquer compositions obtained by mixing the polyamine-amide with Resin A display on brushing no misting of the film surface. Two such lacquer compositions were prepared by mixing 1 part of amide with 1 part of Resin A (Test 1), and 1 part of amide with 2 parts of resin (Test 2). The lacquers were brushed on plates of glass and sheets of aluminum and each was cured for 1 hour at 120° C. The cured films on the plates displayed a pendulum hardness according to Persoz of 108 seconds (Test 1) and 247 seconds (Test 2) respectively. The cured films on the aluminum sheets displayed Erichsen indentation values of 8.4 mm. (Test 1) and 6.75 mm. (Test 2) respectively.

Example 8

300 parts of propylene oxide are added dropwise within 1 hour with thorough stirring to a mixture of 313 parts of castor oil and 8.7 parts of boron trifluoride diethyl etherate of 48% strength, during which the temperature rises to 122° C. Since, when further propylene oxide is added it passes over immediately, another 1.4 parts of boron trifluoride diethyl etherate of 48% strength are added, and the remainder of 48 parts of propylene oxide is added dropwise within 5 minutes. 219 parts of triethylenetetramine are then added and the process described in Example 1 is performed, to yield 700 parts of a light-yellow polyamine-amide of low viscosity which displays excellent compatibility with the Resin A used in Example 6. A lacquer composition containing 1 part of amide to 1 part of Resin A displays no misting of the film surface on brushing.

The above lacquer is brushed over plates of glass and sheets of aluminum and cured in each case for 1 hour at 120° C. to form bright, scratch-proof films. The cured coats on the plates of glass have a pendulum hardness according to Persoz of 113 seconds, and the cured coats on the aluminum sheets have an Erichsen indentation value of 9.0 mm. At room temperature the brushed-on lacquer composition takes 24 hours to cure and form a dust-dry film.

Example 9

In Test 1, 100 parts of the epoxy resin (used in Example 6) which is liquid at room temperature and contains 5.3 epoxide equivalents per kg. (Resin A) are used to dissolve at room temperature 85 parts of the polyamine-amide obtained in Example 1.

In Test 2, the 85 parts of the polyamine-amide prepared as described in Example 1, are replaced by 75 parts of the polyamine-amide prepared according to Example 2 as curing agent.

The resulting curable casting resin mixtures are cast in aluminum tubes (40 x 10 x 140 mm.) and cured for 24 hours at 40° C. To measure the elongation and the tensile strength a further quantity each of Specimens 1 and 2 is cast in moulds according to VSM 77101 and likewise cured for 24 hours at 40° C.

The properties of the two castings are shown in the following table:

| Test | Flexural strength, kg./mm.[2] | Impact strength, cmkg./cm.[2] | Tensile strength, kg./mm.[2] | Elongation in percent |
|---|---|---|---|---|
| 1 | 11 | 12 | 6.1 | 4.3 |
| 2 | 7 | 18 | 3.1 | 17.4 |

Examples 10–25

Examples of lacquers Nos. 10 to 25 in the table below were prepared for reasons of comparison by mixing the epoxide resin used in Example 6 (Resin A), which is liquid at room temperature, with the calculated quantity of a hardener as described below, the proportions being calculated for one epoxide equivalent per amine-hydrogen equivalent.

The hardeners used are amides containing amino groups obtained by reacting the number of mols of triethylene tetramine shown in column 4 on the one hand with the number of mols of hydroxycarboxylic acid shown in column 2, the acid being used as it is (Examples 10, 12, 14, 16, 18, 20) and on the other hand, with the reaction product of the number of mols of hydroxycarboxylic acid shown in column 2 and the number of mols of propylene oxide shown in column 3 in the presence of $BF_3$ (Examples 11, 13, 15, 17, 19, 21).

There are used as further hardeners the reaction products, marketed under the trade names "Versamid 115" and "Versamid 125" of dimerized, unsaturated vegetable fatty acids and aliphatic alkylene polyamines (Examples 22, 23, 24, 25).

The lacquers are prepared simply by mixing the quantity of epoxide resin (Resin A) shown in column 8 with the quantity of hardener shown in column 7. The resin-hardener mixture was applied to glass plates or aluminum sheets by means of a doctor roller to obtain films about 75μ thick.

The other criteria, such as viscosity, etc. can be seen from the caption and the legend in the table.

| (1) | (2) | | | (3) | | (4) | | (5) | (6) |
|---|---|---|---|---|---|---|---|---|---|
| Ex. No. | Hydroxy carboxylic acid | | | Propylene oxide | | Triethylene tetramine | | Reaction conditions | Viscosity of hardener, cps./25° C. |
| | Name, Formula | Mol | Gr. | Mol | Gr. | Mol | Gr. | | |
| 10 | Lactic acid | 1 | 90.0 | | | 1 | 146 | a | 1,920 |
| 11 | $CH_3-CH-COOH$ <br>        $|$ <br>       OH | 1 | 90.0 | 1 | 58 | 1 | 146 | b | 1,280 |
| 12 | Tartaric acid | 1 | 150.1 | | | 2 | 292 | a | 39,400 |
| 13 | $HOOC-CH-CH-COOH$ <br>          $|$   $|$ <br>        OH  OH | 1 | 150.1 | 2 | 116 | 2 | 292 | b | 6,240 |
| 14 | Malic acid | 1 | 134.1 | | | 2 | 292 | a | 8,950 |
| 15 | $HOOC-CH-CH_2-COOH$ <br>         $|$ <br>        OH | 1 | 134.1 | 1 | 58 | 2 | 292 | b | 7,050 |
| 16 | Citric acid | 1 | 210.1 | | | 2 | 292 | a | 6,260,000 |
| 17 | $HOOC-CH_2-C-CH_2-COOH$ <br>                $/\,\backslash$ <br>          HOOC   OH | 1 | 210.1 | 1 | 58 | 2 | 292 | b | 556,000 |
| 18 | Salicyclic acid | 1 | 138.1 | | | 1 | 146 | a | 17,900 |
| 19 | (phenyl)-OH / (phenyl)-COOH | 1 | 138.1 | 1 | 58 | 1 | 146 | b | 838,000 |
| 20 | Ricinoleic acid | 1 | 298.5 | | | 1 | 146 | a | 16,000 |
| 21 | $CH_3-(CH_2)_5-CH-CH_2-CH$ <br>                $|$        $\|$ <br>               OH <br> $HOOC-(CH_2)_7CH$ | 1 | 298.5 | 1 | 58 | 1 | 146 | b | 2,560 |
| 22 | Versamid 115 | | | | | | | | 850,000 |
| 23 | ___do___ | | | | | | | | 850,000 |
| 24 | Versamid 125 | | | | | | | | 76,200 |
| 25 | ___do___ | | | | | | | | 76,200 |

See footnotes at end of table.

| (1) | (7) | (8) | (9) | (10) | | (11) |
|---|---|---|---|---|---|---|
| Ex. No. | Hardener (Resin A) in gr. | Quantity epoxide (Resin A) in gr. | Aspect of mixture (7)+(8) when spread on glass plates | Indentation value (Erichsen) in mm.; aluminum sheets; hardening | | Rating for film surface (exudation) (after 24 hours) |
| | | | | 6 days room temperature | 6 days, 120° C. | |
| 10 | 47.25 | 200 | Dark brown, clear | 0.2 | 1.1 | 2 |
| 11 | 58.8 | 200 | ----do---- | 0.6 | 0.6 | 1 |
| 12 | 44.2 | 200 | ----do---- | 0.15 | 0.9 | 1 |
| 13 | 55.8 | 200 | ----do---- | 1.15 | 3.3 | 1 |
| 14 | 42.6 | 200 | ----do---- | 0.1 | 1.1 | 1 |
| 15 | 48.4 | 200 | ----do---- | 0.2 | 1.3 | 1 |
| 16 | 50.2 | 200 | ----do---- | 2.15 | 2.0 | 1 |
| 17 | 56.0 | 200 | ----do---- | 3.45 | 0.7 | 1 |
| 18 | 58.0 | 200 | Pale yellow, clear | 0.3 | 4.3 | 2–3 |
| 19 | 68.4 | 200 | | 0.15 | 1.2 | 1 |
| 20 | 98.9 | 200 | Pale yellow, very turbid | 7.5 | 5.8 | 3 |
| 21 | 100.5 | 200 | Pale yellow, clear | 10.0 | 4.7 | 1 |
| 22 | 200 | 200 | Yellow turbid | 10 | 4.8 | 2 |
| 23 | 85.6 | 200 | ----do---- | 10 | 5.0 | 3 |
| 24 | 200 | 200 | ----do---- | 8.5 | 6.9 | 2 |
| 24 | 85.6 | 200 | ----do---- | 9.5 | 3.2 | 2 |

REACTION CONDITIONS.—(a) Heating at 220° C. until 1 (or 2) mols of $H_2O$ have distilled over. (b) Addition of 0.7% $BF_3$ (in the form of the $BF_3$ ethyl etherate 48% $BF_3$, 100%) calculated on the hydroxycarboxylic acid. React propylene oxide in the presence of 200 parts of toluene with the acid, then add 1 (or 2) mols of triethylene tetramine, heat to 220° C. until 1 (or 2) mols of $H_2O$ have distilled over.

LEGEND:
Exudation:      Rating
Nil --------------- 1
Medium ----------- 2
Strong ----------- 3

What is claimed is:

1. An amino-amide, which is obtained by reacting without external heating a hydroxy compound selected from the group consisting of aliphatic monocarboxylic acids having 1 to 2 alcoholic hydroxyl groups and 12 to 18 carbon atoms, and esters of aliphatic monocarboxylic acids having 1 to 2 alcoholic hydroxyl groups and 12 to 18 carbon atoms, with a saturated aliphatic alcohol having 1 to 3 hydroxyl groups and 1 to 6 carbon atoms, in a first stage in the presence of a Lewis acid with a 1,2-epoxy compound, in which first reaction stage the alcoholic hydroxyl group(s) of the said hydroxy compound are etherified, and by heating the resulting etherified product in a second stage with a saturated aliphatic diprimary polyamine having at least 2 primary amino groups, in which second reaction stage the group selected from the class consisting of carboxyl group and carboxylic acid ester group is converted into a carboxylic acid amide group at a temperature sufficient to eliminate a compound selected from the group consisting of water and aliphatic saturated alcohol having 1 to 3 hydroxyl groups and 1 to 6 carbon atoms.

2. An amino-amide, which is obtained by reacting without external heating ricinoleic acid in a first reaction stage in the presence of a Lewis acid with a 1,2-epoxy compound, in which first reaction stage the alcoholic hydroxyl group of the ricinoleic acid is etherified, and by heating the resulting etherified product in a second stage with a di-primary polyalkylene polyamine, in which second reaction stage the carboxyl group of the ricinoleic acid is converted into an carboxylic acid amide group with distillation of water.

3. An amino-amide, which is obtained by reacting without external heating ricinoleic acid in a first reaction stage in the presence of a Lewis acid with a 1,2-mono-epoxy compound, in which first reaction stage the alcoholic hydroxyl group of the ricinoleic acid is etherified, and by heating the resulting etherified product in a second stage with a diprimary polyalkylene polyamine, in which second reaction stage the carboxyl group of the ricinoleic acid is converted into an carboxylic acid amide group with distillation of water.

4. An amino-amide, which is obtained by reacting without external heating ricinoleic acid in a first reaction stage in the presence of a Lewis acid with propylene oxide, in which first reaction stage the alcoholic hydroxyl group of the ricinoleic acid is etherified, and by heating the resulting etherified product in a second stage with a di-primary polyalkylene polyamine, in which second reaction stage the carboxyl group of the ricinoleic acid is converted into an carboxylic acid amide group with distillation of water.

5. An amino-amide, which is obtained by reacting without external heating castor oil in a first reaction stage in the presence of a Lewis acid with a 1,2-epoxy compound, in which first reaction stage the alcoholic hydroxyl groups of the castor oil are etherified, and by heating the resulting etherified product in a second stage with a diprimary polyalkylene polyamine, in which second reaction stage the carboxylic acid ester groups of the castor oil are converted into carboxylic acid amide groups with distillation of glycerol.

6. An amino-amide, which is obtained by reacting without external heating castor oil in a first reaction stage in the presence of a Lewis acid with a 1,2-mono-epoxy compound, in which first reaction stage the alcoholic hydroxyl groups of the castor oil are etherified, and by heating the resulting etherified product in a second stage with a diprimary polyalkylene polyamine, in which second reaction stage the carboxylic acid ester groups of the castor oil are converted into carboxylic acid amide groups with distillation of glycerol.

7. An amino-amide, which is obtained by reacting without external heating castor oil in a first reaction stage in the presence of a Lewis acid with propylene oxide, in which first reaction stage the alcoholic hydroxyl groups of the castor oil are etherified, and by heating the resulting etherified product in a second stage with a diprimary polyalkylene polyamine, in which second reaction stage the carboxylic acid ester groups of the castor oil are converted into carboxylic acid amide groups with distillation of glycerol.

No references cited.

NICHOLAS S. RIZZO, *Primary Examiner.*

CHARLES B. PARKER, *Examiner.*

A. H. SUTTO, F. M. MIKA, *Assistant Examiners.*